United States Patent
Randell

(10) Patent No.: US 7,228,471 B2
(45) Date of Patent: Jun. 5, 2007

(54) SYSTEM AND METHOD FOR TESTING A DATA STORAGE DEVICE WITHOUT REVEALING MEMORY CONTENT

(75) Inventor: Jerrold R. Randell, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 241 days.

(21) Appl. No.: 11/098,496

(22) Filed: Apr. 5, 2005

(65) Prior Publication Data

US 2005/0278591 A1    Dec. 15, 2005

Related U.S. Application Data

(60) Provisional application No. 60/579,459, filed on Jun. 14, 2004.

(51) Int. Cl.
*G11C 29/00*    (2006.01)
*G06F 7/04*    (2006.01)

(52) U.S. Cl. .......................................... 714/718; 726/2
(58) Field of Classification Search ...................... None
See application file for complete search history.

(56) References Cited

U.S. PATENT DOCUMENTS

| 4,864,615 A * | 9/1989 | Bennett et al. ............. 380/239 |
| RE36,181 E * | 4/1999 | Koopman et al. .......... 713/168 |
| 6,324,287 B1 * | 11/2001 | Angert ........................ 380/43 |
| 2005/0154953 A1 * | 7/2005 | Norskog ..................... 714/738 |

* cited by examiner

*Primary Examiner*—Christine T. Tu
(74) *Attorney, Agent, or Firm*—Dimock Stratton LLP; Mark B. Eisen

(57) ABSTRACT

A system and method for testing a data storage device without revealing memory content. To control the individual bits of the memory during testing each value is written into the memory according to the equation

NEW_DATA=CURRENT_DATA XOR DATA_SEED such that individual bits of NEW_DATA are equal to CURRENT_DATA with selected bits inverted when the corresponding positions in DATA_SEED are high. NEW_DATA is written into the memory, read out and verified, so that all bit positions can be controlled and tested in both logic states, while NEW_DATA and CURRENT_DATA are not ascertainable by the testing software.

15 Claims, 19 Drawing Sheets

SEC Control Register

SEC-CTRL  
Read/Write  
Reset State: 0x0000  
Access: 16 bit

| 15 | 14 | 13 | 12 | 11 | 10 | 9 | 8 |
|---|---|---|---|---|---|---|---|
| NA ||||||||

| 7 | 6 | 5 | 4 | 3 | 2 | 1 | 0 |
|---|---|---|---|---|---|---|---|
| FAST_IF | CLEAR_SDRAM | DIS_ENCRYPT | KEY_SELECT[1:0] || CMD[2:0] |||

| Bit # | Bit Mnemonic | Function |
|---|---|---|
| 15:8 | NA | (RO) '0000 0000' |
| 7 | FAST_IF | Fast Interface (R/W)<br><br>0 : Normal (EEPROM clock speed = sys_clk/1024)<br>1 : Fast (EEPROM clock speed = sys_clk/8)<br><br>Fast mode is provided for debug/test purposes only. EEPROM operation is not characterized at this speed. |
| 6 | CLEAR_SDRAM | Clear SDRAM (R/W)<br><br>0 : CLEAR_SDRAM signal to SIC is controlled by state machine<br>1 : CLEAR_SDRAM signal to SIC is asserted |
| 5 | DIS_ENCRYPT | Disable Encryption (R/W*)<br><br>0 : Encryption and decryption is performed as per the current state.<br>1 : Encryption and decryption is bypassed.<br><br>This bit is only writeable when accessed from the processor interface |
| 4:3 | KEY_SELECT[1:0] | Key Select (R/W)<br><br>00 : Password and Key set 0<br>01 : Password and Key set 1<br>10 : Password and Key set 2<br>11 : Password and Key set 3 |
| 2:0 | CMD[2:0] | Key Command (R/W)<br><br>000 : GET_KEY<br>001 : COMPARE<br>010 : ADD_KEY<br>011 : REMOVE_KEY<br>100 : CHANGE_KEY<br>101 : UPDATE_KEY<br>110 : ENTER_DEBUG<br>111 : EXIT_DEBUG |

FIG.7A

| Bit # | Bit Mnemonic | Function |
|---|---|---|
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG.7B

SEC Status Register

SEC-STAT
Read/Write

Reset State: 0x0000
Access: 16 bit

| 15 | 14 | 13 | 12 | 11 | 10 | 9 | 8 |
|---|---|---|---|---|---|---|---|
| CMD_BUSY | EEPROM_BUSY | EEPROM_ERROR | NA | | | | SDRAM_CLEAR |

| 7 | 6 | 5 | 4 | 3 | 2 | 1 | 0 |
|---|---|---|---|---|---|---|---|
| KEY_STAT[1:0] | | PW_STAT[1:0] | | MODE[3:0] | | | |

| Bit # | Bit Mnemonic | Function |
|---|---|---|
| 15 | CMD_BUSY | Command Busy (RO)<br>0 : not busy<br>1 : busy<br>This bit will be cleared when the current command has completed. |
| 14 | EEPROM_BUSY | EEPROM Busy (RO)<br>0 : not busy<br>1 : busy, eeprom device address was not acknowledged during Get_Key<br>This bit will be cleared upon writing to this register |
| 13 | EEPROM_ERROR | EEPROM Error (R/O)<br>0 : no error<br>1 : error, eeprom word address, or write data was not acknowledged or device address was not acknowledged after a 15 ms time out<br>This bit will be cleared upon writing to this register |
| 12:9 | NA | (RO) '0 0000' |
| 8 | SDRAM_CLEAR | SDRAM_CLEAR (R/O)<br>0 : SDRAM_CLEARED was not asserted<br>1 : SDRAM_CLEARED was asserted<br>This bit will be cleared upon writing to this register |
| 7:6 | KEY_STAT | Key Compare Status<br>00 : no result<br>01 : Key Match<br>10 : Key Mismatch, or no old key had been loaded<br>11 : Comparison being made |
| 5:4 | PW_STAT | Password Compare Status (R/O)<br>00 : no result, password cleared<br>01 : Password Valid<br>10 : Password Invalid<br>11 : Comparison being made |

FIG.8A

| Bit # | Bit Mnemonic | Function |
|---|---|---|
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG.8B

SEC Password Register Field

SEC-PW

| MCU_ADDR OFFSET | REG Mnemonic | REG Bits (D[15:0]) | Reset State |
|---|---|---|---|
| 0xE | SEC-PW7 | PW[127:112] | 0x0000 |
| 0xC | SEC-PW6 | PW[111:96] | 0x0000 |
| 0xA | SEC-PW5 | PW[95:80] | 0x0000 |
| 0x8 | SEC-PW4 | PW[79:64] | 0x0000 |
| 0x6 | SEC-PW3 | PW[63:48] | 0x0000 |
| 0x4 | SEC-PW2 | PW[47:32] | 0x0000 |
| 0x2 | SEC-PW1 | PW[31:16] | 0x0000 |
| 0x0 | SEC-PW0 | PW[15:0] | 0x0000 |

| Bit Mnemonic | Function |
|---|---|
| PW[127:0] | Password (W only)<br>This field contains the password that is used for comparision purposes, and for the password that is linked with a new encryption keys.<br><br>The full password must be entered while in Key_Loaded, Secure, or the Validated states in order to execute the ADD_KEY, REMOVE_KEY, CHANGE_KEY, or COMPARE commands. Otherwise, transition from those states is prohibited. |

FIG.9

SYSTEM AND METHOD FOR TESTING A DATA STORAGE DEVICE WITHOUT REVEALING MEMORY CONTENT

FIELD OF INVENTION

This invention relates to data processing systems. In particular, this invention relates to a system and method for testing a data storage device without revealing memory content.

BACKGROUND OF THE INVENTION

The use of portable data processing systems has increased significantly in recent years. In addition to so called "laptop" and "tablet" computers, there is a growing popularity in handheld data processing devices, often called a "personal digital assistant" or "PDA." All of these devices are capable of storing a significant amount of user data, including calendar, address book, tasks and numerous other types of data for business and personal use. Most handheld data processing devices have the ability to connect to a personal computer for data exchange, and many are equipped for wireless communications using, for example, conventional email messaging systems. Depending upon the user's needs much of this data can be highly sensitive in nature, especially for example in a government, military or commercial context.

Portable data processing systems are typically password protected. However, in the hands of a technically sophisticated individual with malicious intent, there are ways to obtain the data stored in memory in such a device if the data is not encrypted. Accordingly, the data stored in persistent memory is typically encrypted using an encryption key. The data is secure as long as the encryption key remains unknown.

There are two competing parameters in any high security embedded system. The first is to prevent an attacker from accessing secure data or taking control of the system. The second is to allow the system to be tested and debugged, both during development and after the product has been launched. For example, common debug mechanism available in embedded systems is known as the "JTAG" port, which can be used to communicate with the processor, and read from and write to memory locations, so that the processor and memory can be thoroughly tested.

However, there are cases when it is desired that the actual contents of memory not be known at any time, by software or by any other entity except for the hardware itself. Encryption key storage is an important example. To ensure system security, it is desirable that the encryption keys stored in memory never be known. At the same time, during manufacturing or at any other time when the memory needs to be tested, it is desirable to be able to control and monitor specific memory bit positions to verify their integrity and to isolate error locations.

One test approach is to have software perform writes, reads and compares to the memory location being tested, but this method reveals the memory contents to software, and thus potentially to an attacker who accesses the system through the debugging port. It would accordingly be advantageous to provide a method for testing a secure memory under software control, without revealing the memory contents.

SUMMARY OF THE INVENTION

According to the invention, to control the individual bits of the memory during the test procedure the value is written into the memory according to the following equation:

$$NEW\_DATA = CURRENT\_DATA \text{ XOR } DATA\_SEED$$

such that individual bits of NEW_DATA are equal to CURRENT_DATA with selected bits inverted when the corresponding positions in DATA_SEED are a '1'. NEW_DATA is written into the memory, read out and verified, so that all bit positions can be controlled and tested in both the logic 1 and 0 states, while NEW_DATA and CURRENT_DATA are never actually known or ascertainable by the testing software.

The present invention thus provides a method of testing a data storage device without revealing a memory content of the data storage device, comprising the steps of: a. reading a Current Value of a memory location in the data storage device, comprising a plurality of bits of data, b. writing a New Value into the same memory location in the data storage device according to the equation $$\text{New Value} = \text{Current Value XOR Data Seed}$$

where Data Seed is a value obtained from a data seed register, c. writing a copy of New Value into a data-written register, d. reading New Value out of the data storage device, e. comparing New Value read out of the data storage device in step d. to the corresponding New Value in the data-written register to verify the accuracy of the data read out of the data storage device in step d.

The present invention further provides a system for testing a data storage device without revealing a memory content of the data storage device, comprising a processor for reading a Current Value of each of a plurality of memory locations in the data storage device, comprising a plurality of bits of data, generating for Current Value a New Value according to the equation $$\text{New Value} = \text{Current Value XOR Data Seed}$$

where Data Seed is a value obtained from a data seed register, and writing New Value into the same memory location in the data storage device that stored the corresponding Current Value, and a data-written register for storing a copy of New Value, whereby the accuracy of the data read out of the data storage device can be verified by comparing New Value in the data storage device with the corresponding New Value in the data-written register.

The present invention further provides a computer program product for use with a computer, the computer program product comprising a computer usable medium having computer readable program code means embodied in said medium for testing a data storage device without revealing a memory content of the data storage device, said computer program product having a. computer readable program code means for reading a Current Value of a memory location in the data storage device, comprising a plurality of bits of data, b. computer readable program code means for writing a New Value into the same memory location in the data storage device according to the equation $$\text{New Value} = \text{Current Value XOR Data Seed}$$

where Data Seed is a value obtained from a data seed register, c. computer readable program code means for writing a copy of New Value into a data-written register, d.

computer readable program code means for reading New Value out of the data storage device, and e. computer readable program code means for comparing New Value read out of the data storage device to the corresponding New Value in the data-written register to verify the accuracy of the data read out of the data storage device.

BRIEF DESCRIPTION OF THE DRAWINGS

In drawings which illustrate by way of example only a preferred embodiment of the system.

FIGS. 7A and 7B are first and second parts of a Control Register table for the for the Serial EEPROM Controller of FIG. 5.

FIGS. 8A and 8B are first and second parts of a Status Register table for the Serial EEPROM Controller of FIG. 5.

FIG. 9 is a Key Seed Register Field table for the Serial EEPROM Controller of FIG. 13.

DETAILED DESCRIPTION OF THE INVENTION

Figure 1:
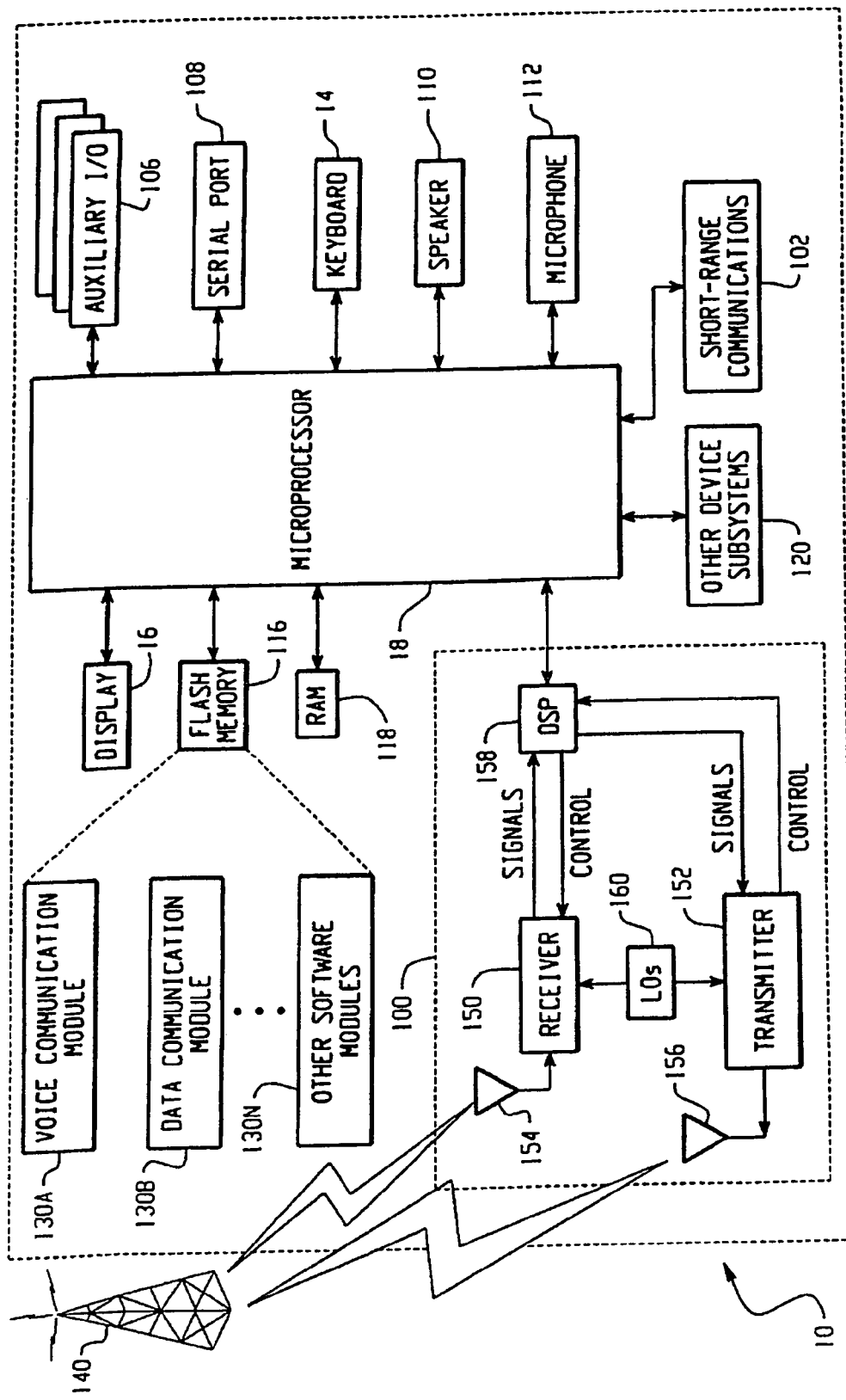
FIG. 1 is a block diagram of a system overview of a conventional mobile data processing device.
Figure 2:
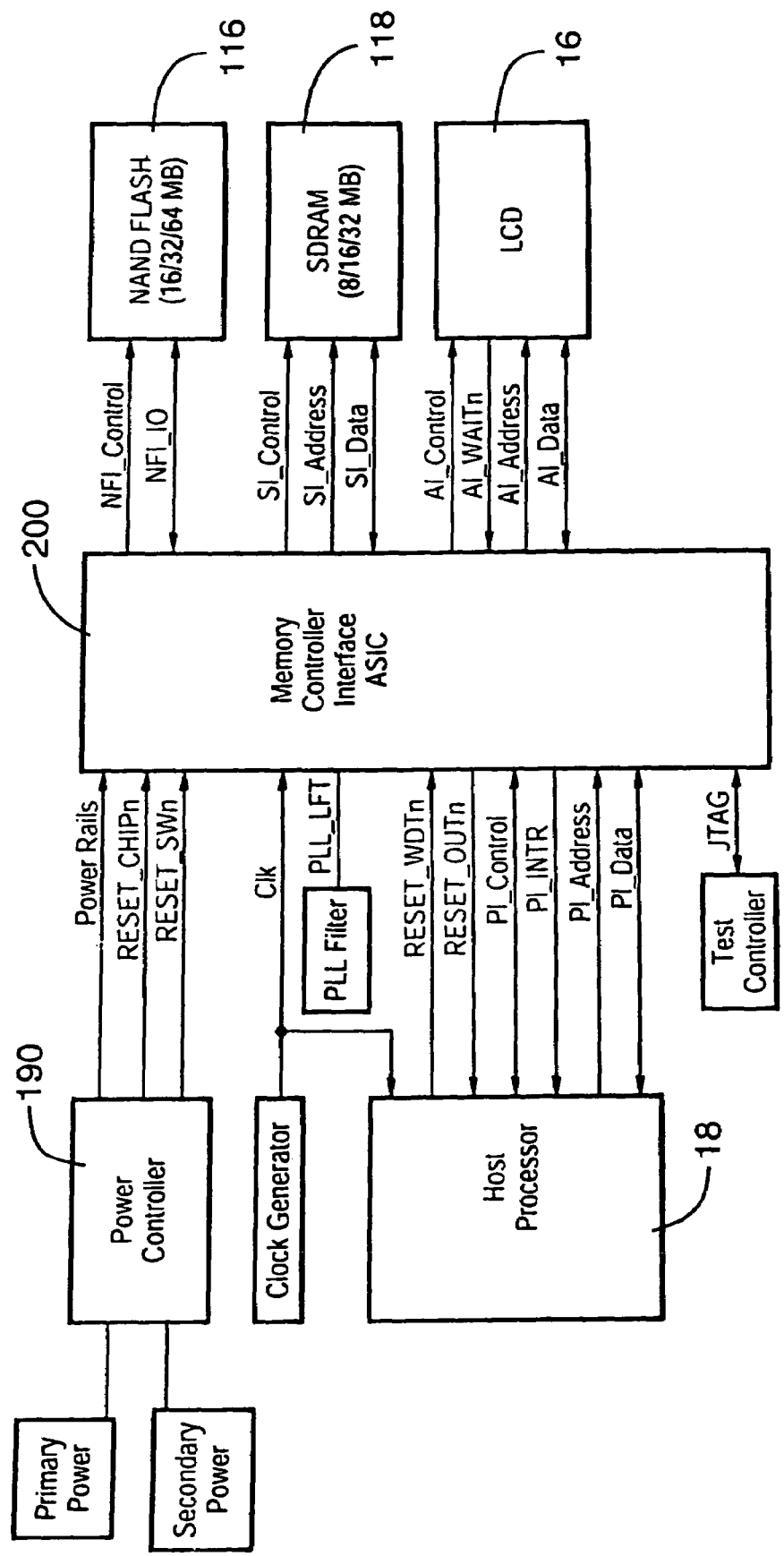
FIG. 2 is a system interface block diagram of a data processor in the data processing device of FIG. 1.
Figure 3A:
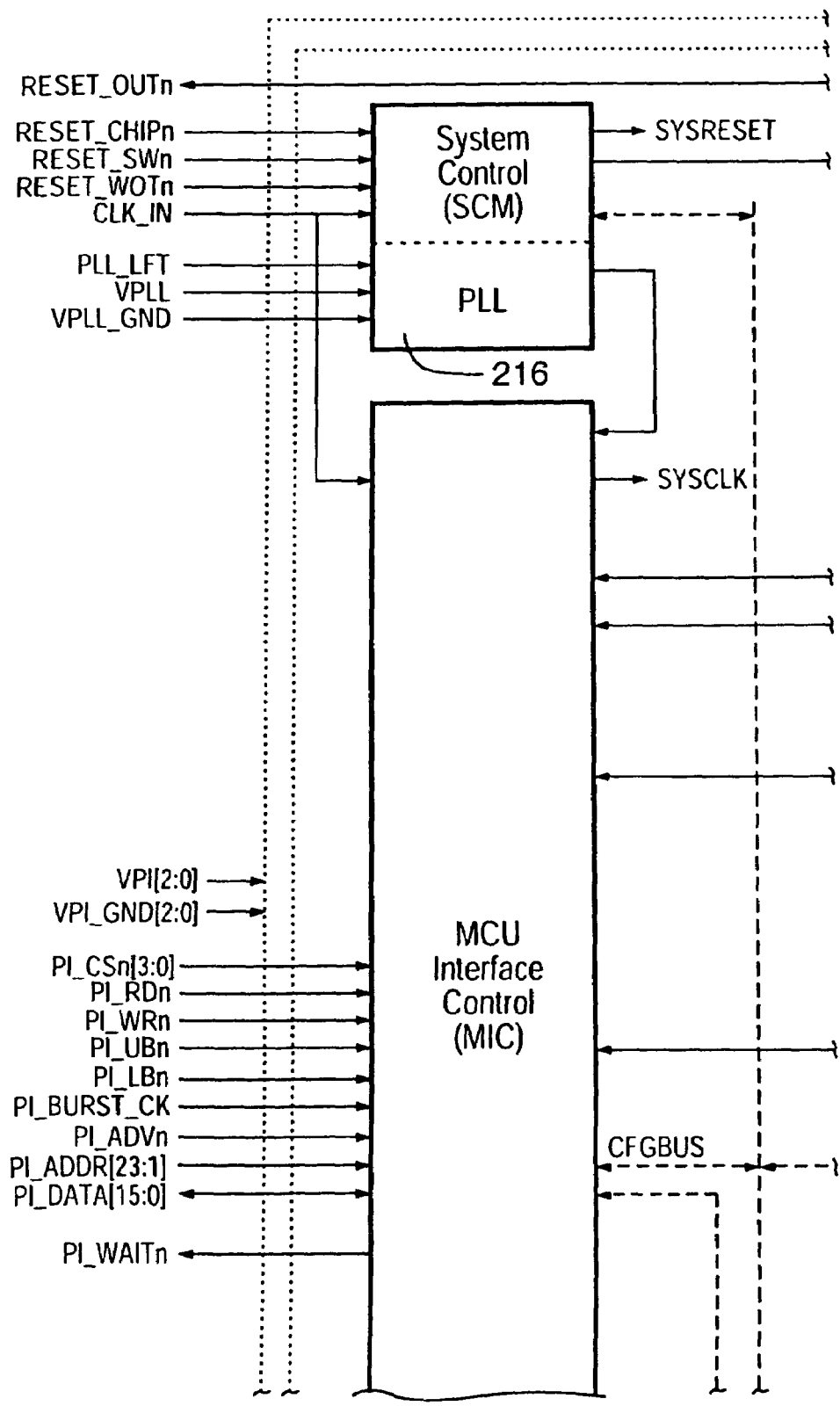
FIG. 3 is a detailed block diagram of the memory controller interface in the data processor of FIG. 2.
Figure 3B:
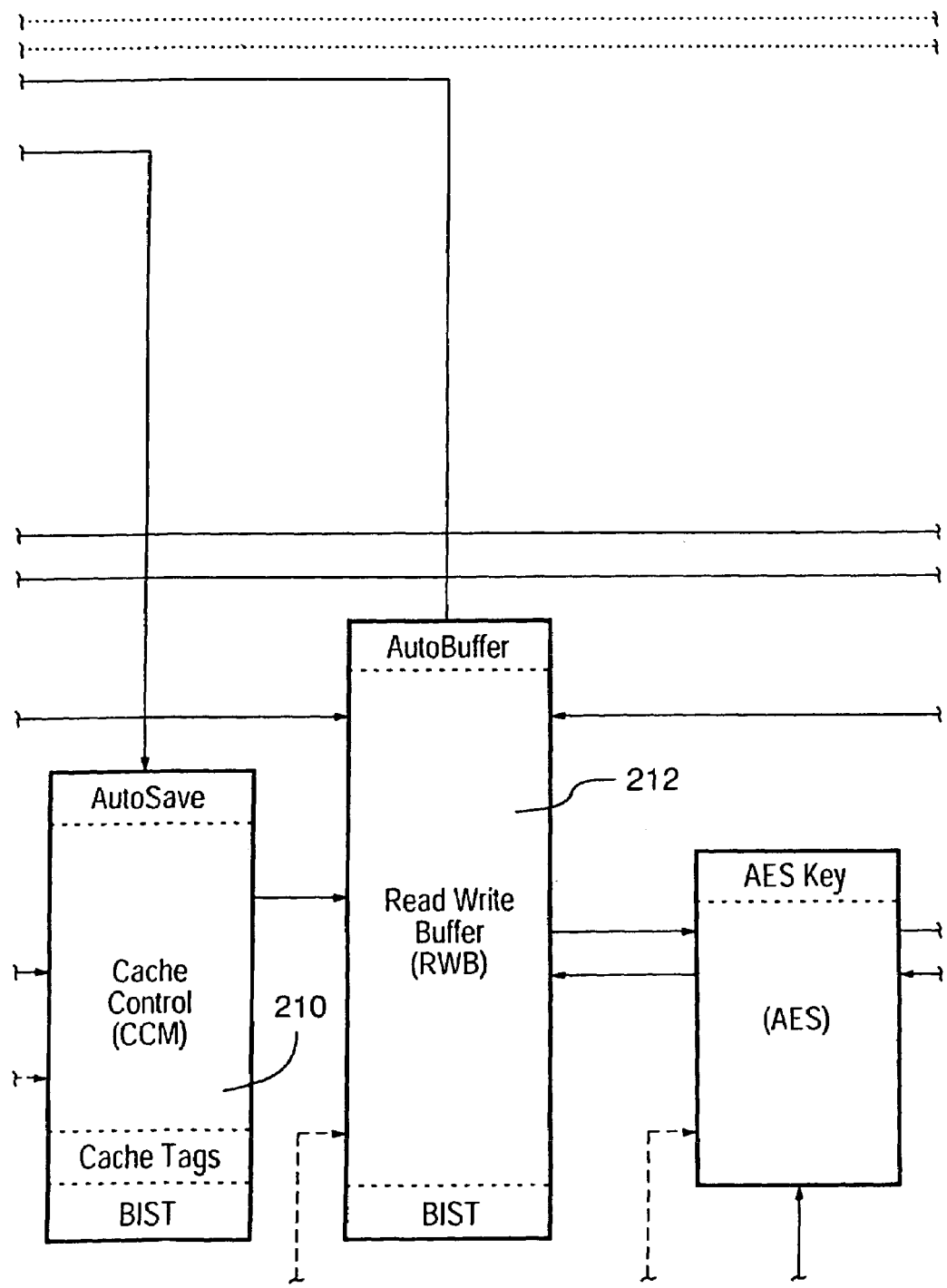
Figure 3C:
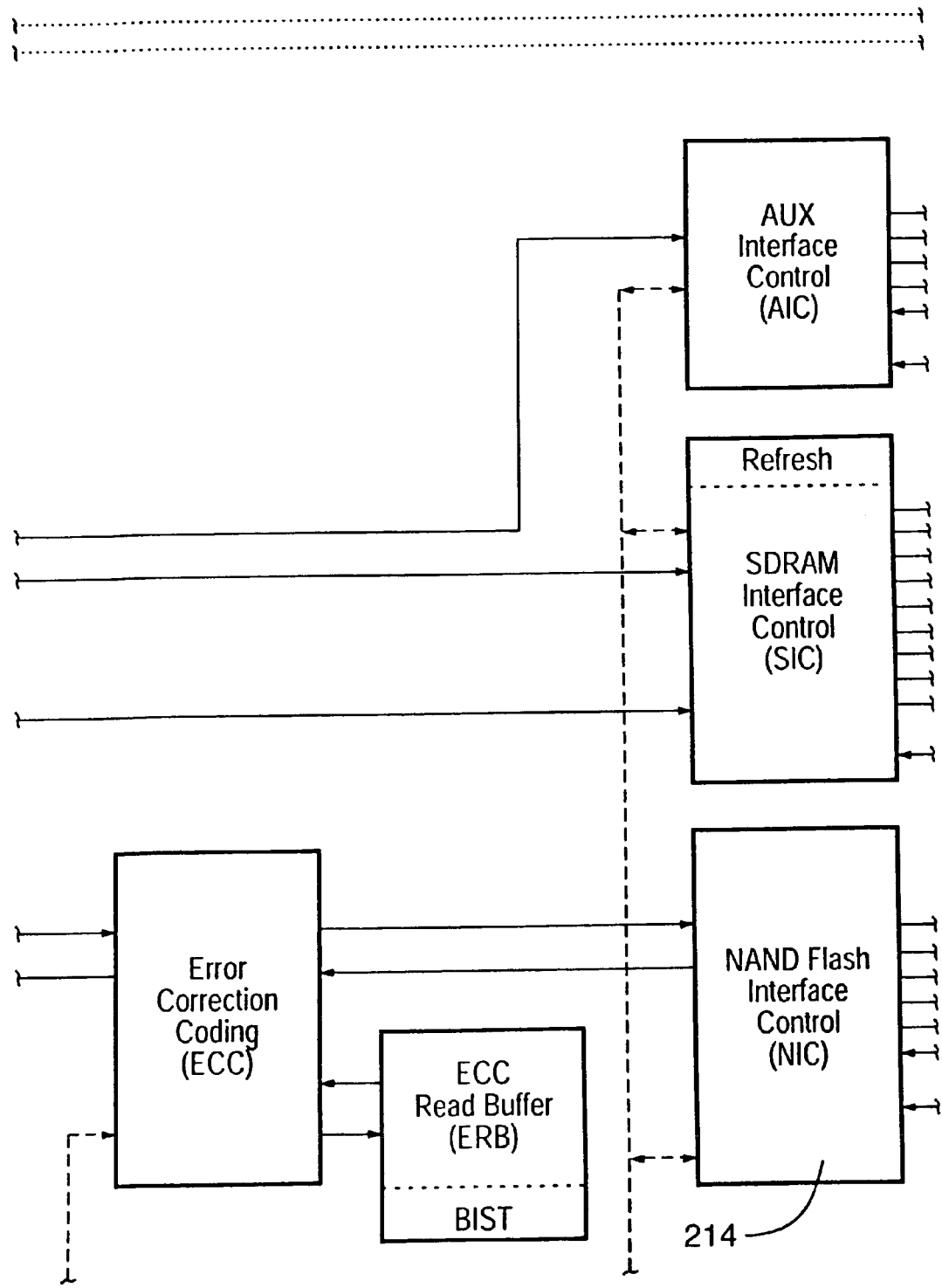
Figure 3D:
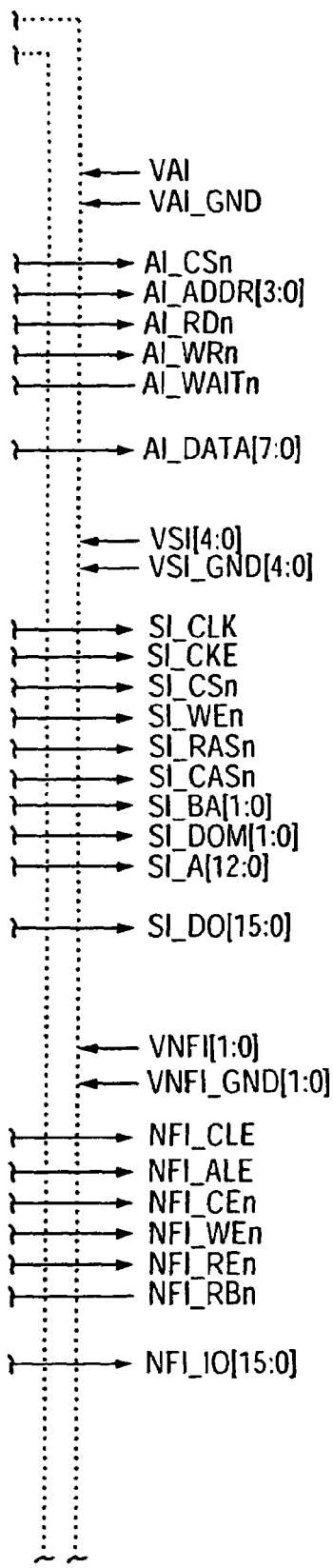
Figure 3E:
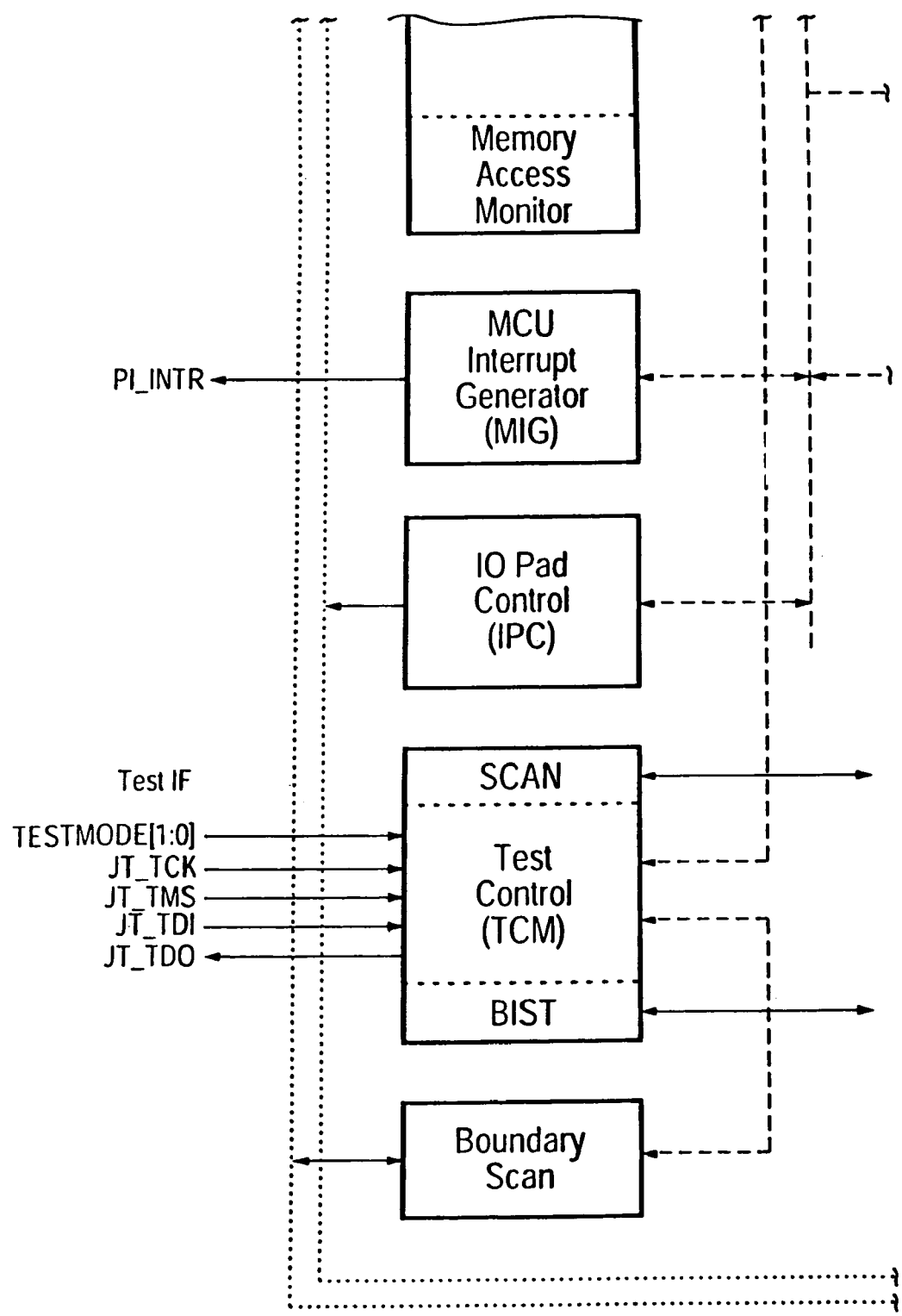
Figure 3F:
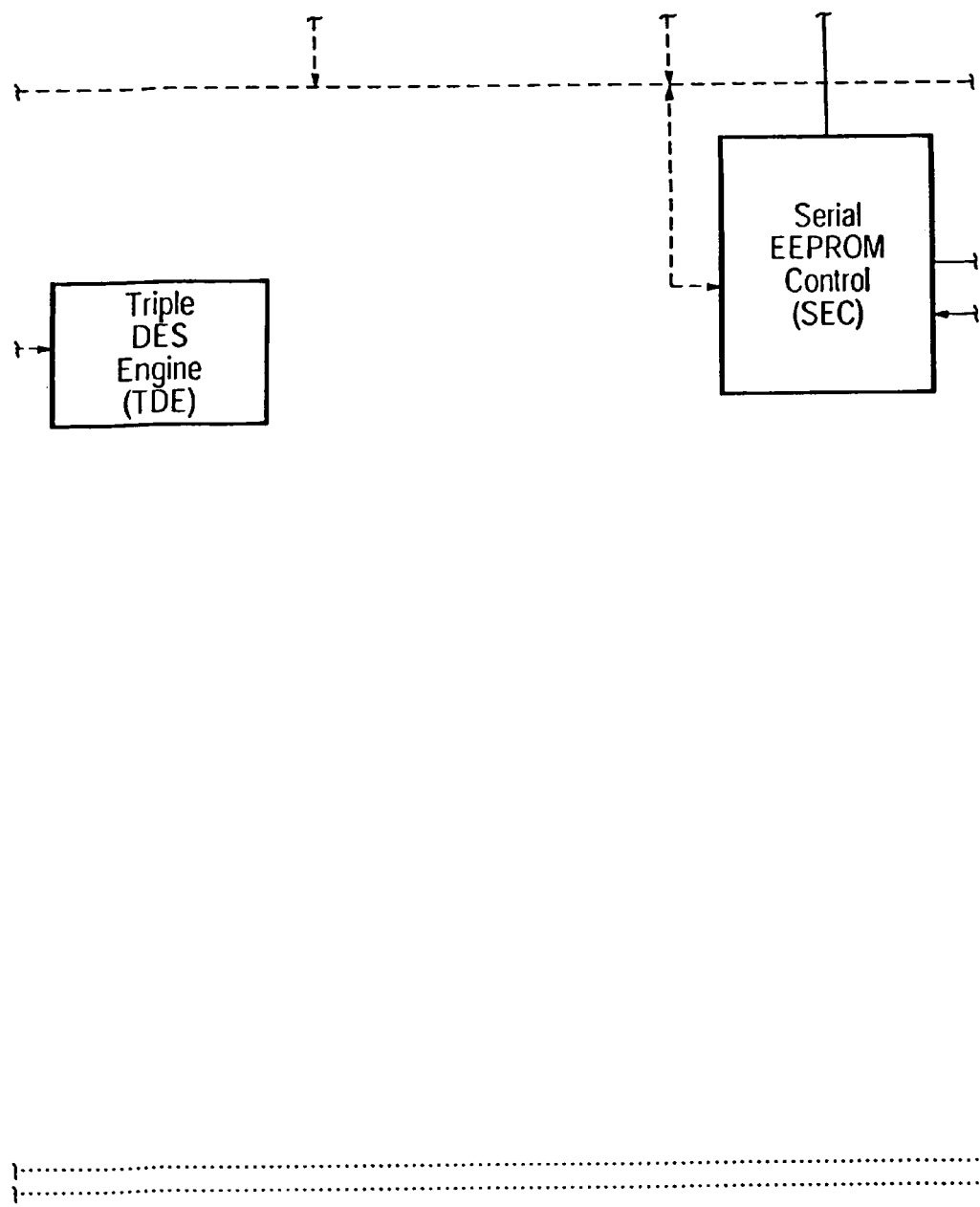
Figure 3G:
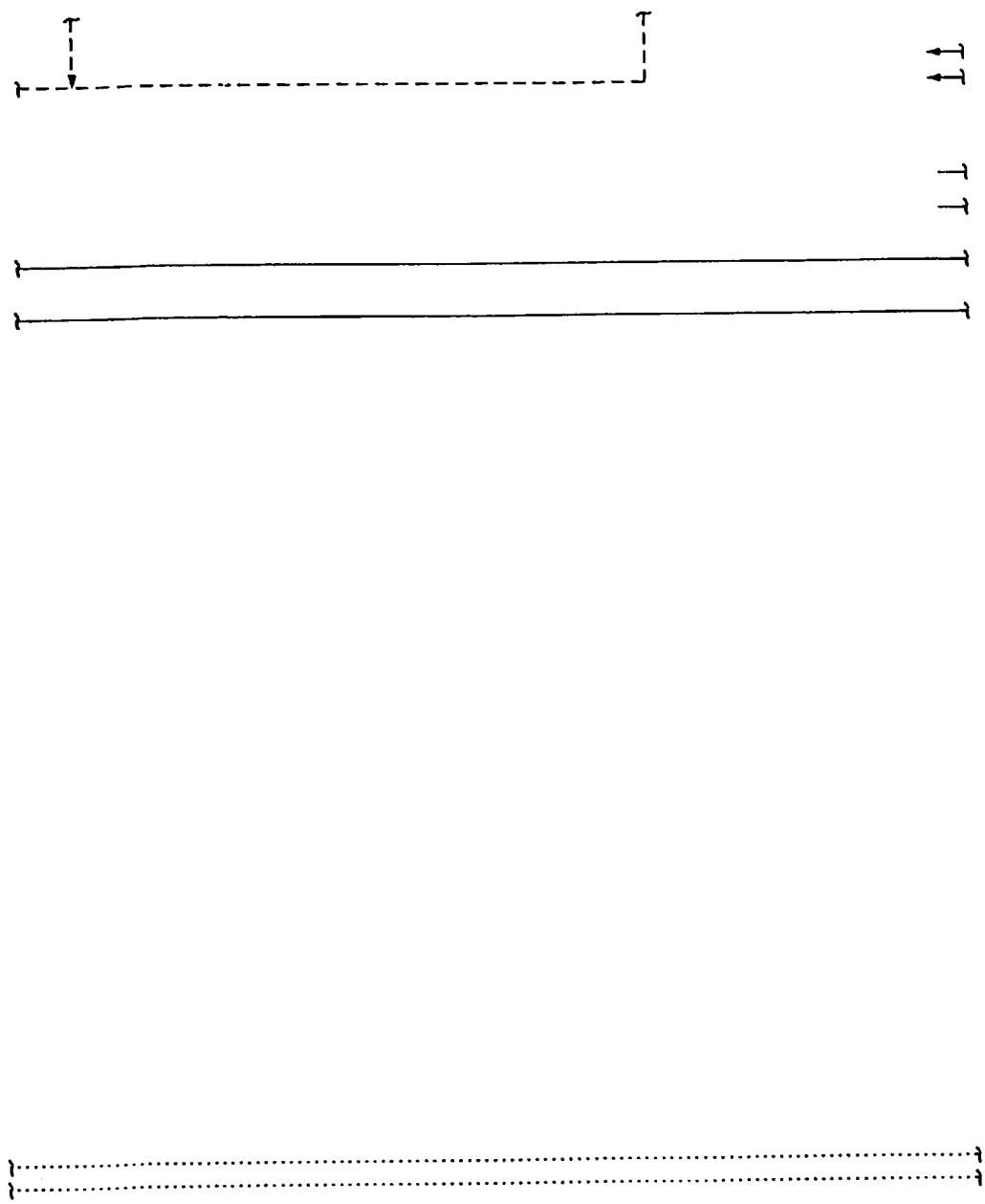
Figure 3H:
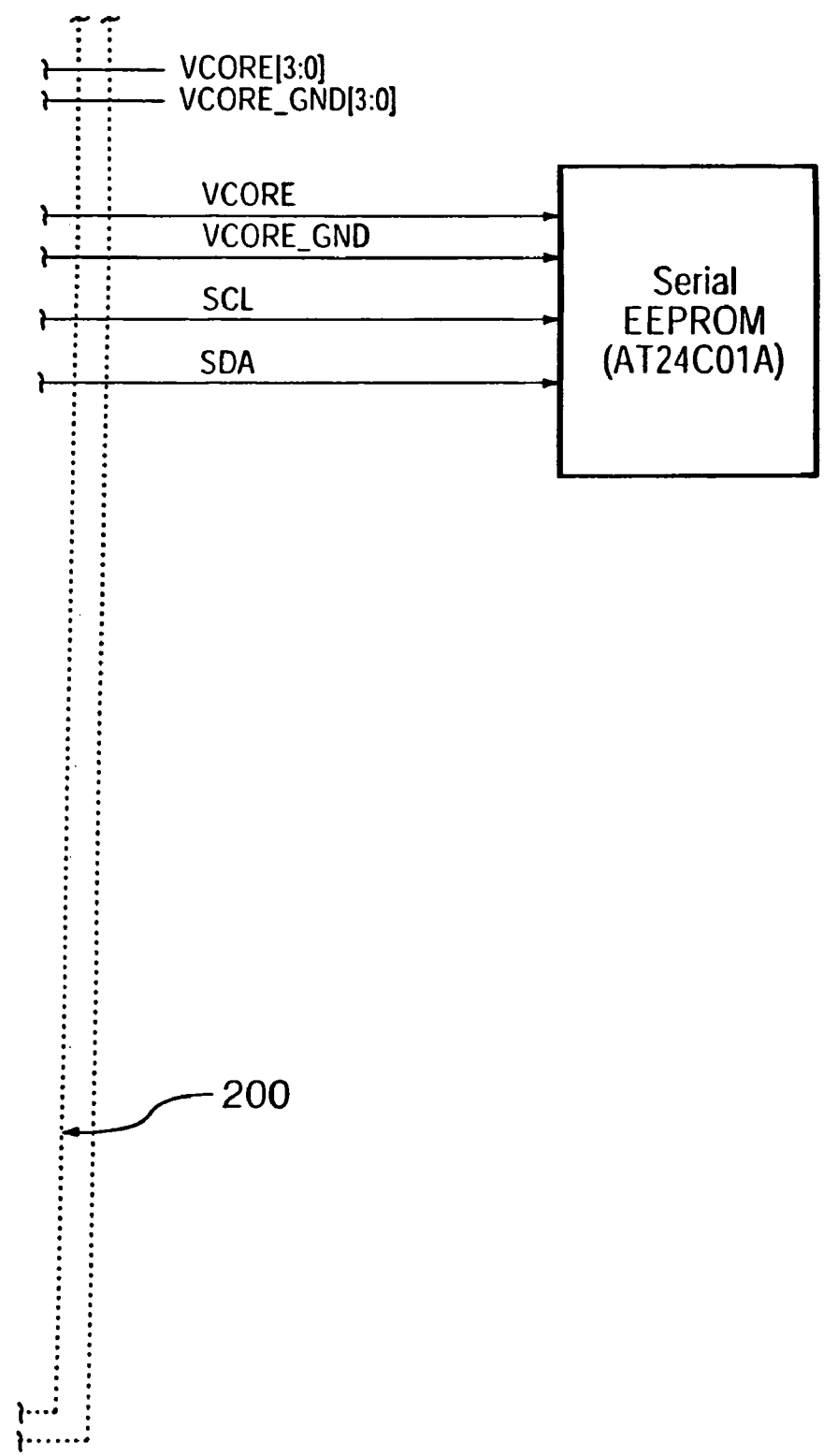
Figure 3I:
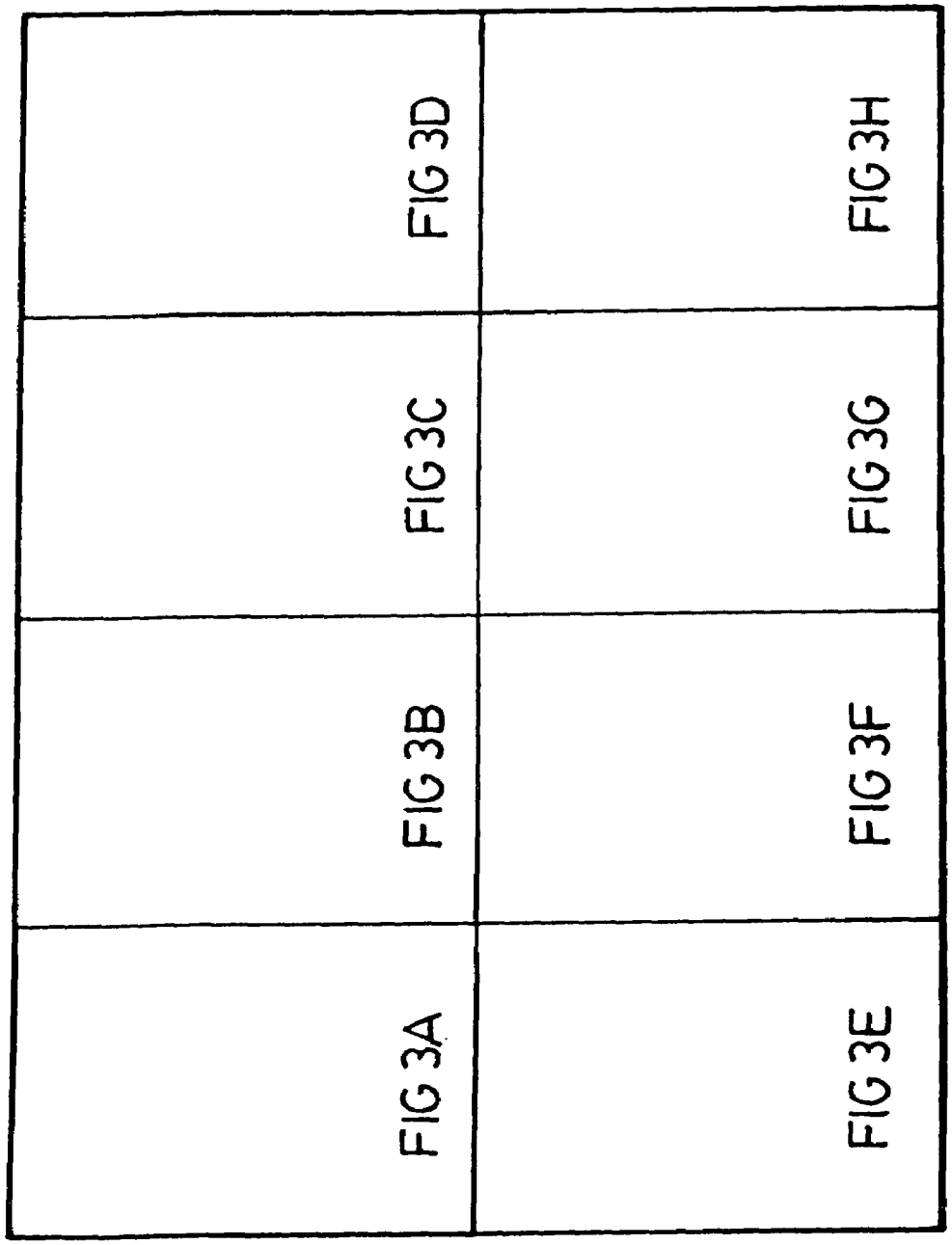

A preferred embodiment of the system of the invention will be described in detail below, by way of example only, in the context of a hand-held mobile data processing device having wireless communications capabilities as illustrated in FIGS. 1 to 3. However, it will be appreciated that the principles apply to other data processing devices and the system is not intended to be limited thereby.

The hand-held data processing devices 10 include a housing, a keyboard 14 and an output device 16. The output device shown is a display 16, which is preferably a full graphic LCD. Other types of output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard may include a mode selection key, or other hardware or software for switching between text entry and telephony entry.

In addition to the processor 18, other parts of the mobile device 10 are shown schematically in FIG. 1. These include a communications subsystem 100; a short-range communications subsystem; the keyboard 14 and the display 16, along with other input/output devices 106, 108, 110 and 112; as well as memory devices 116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processor 18, in addition to its operating system functions, enables execution of software applications 130A–130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 4:
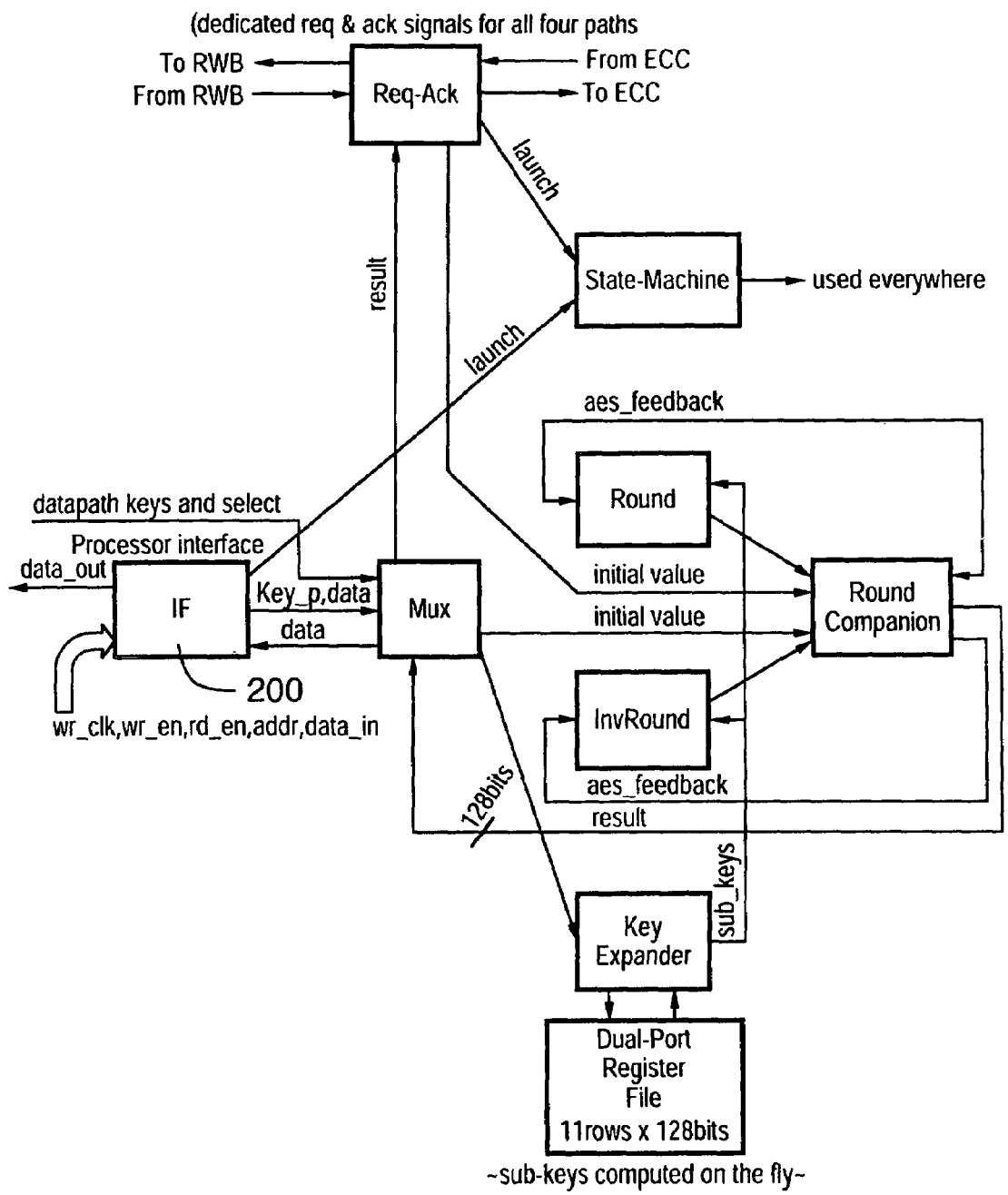
FIG. 4 is a detailed block diagram of an AES encryption module in the data processor of FIG. 2.
Figure 5:
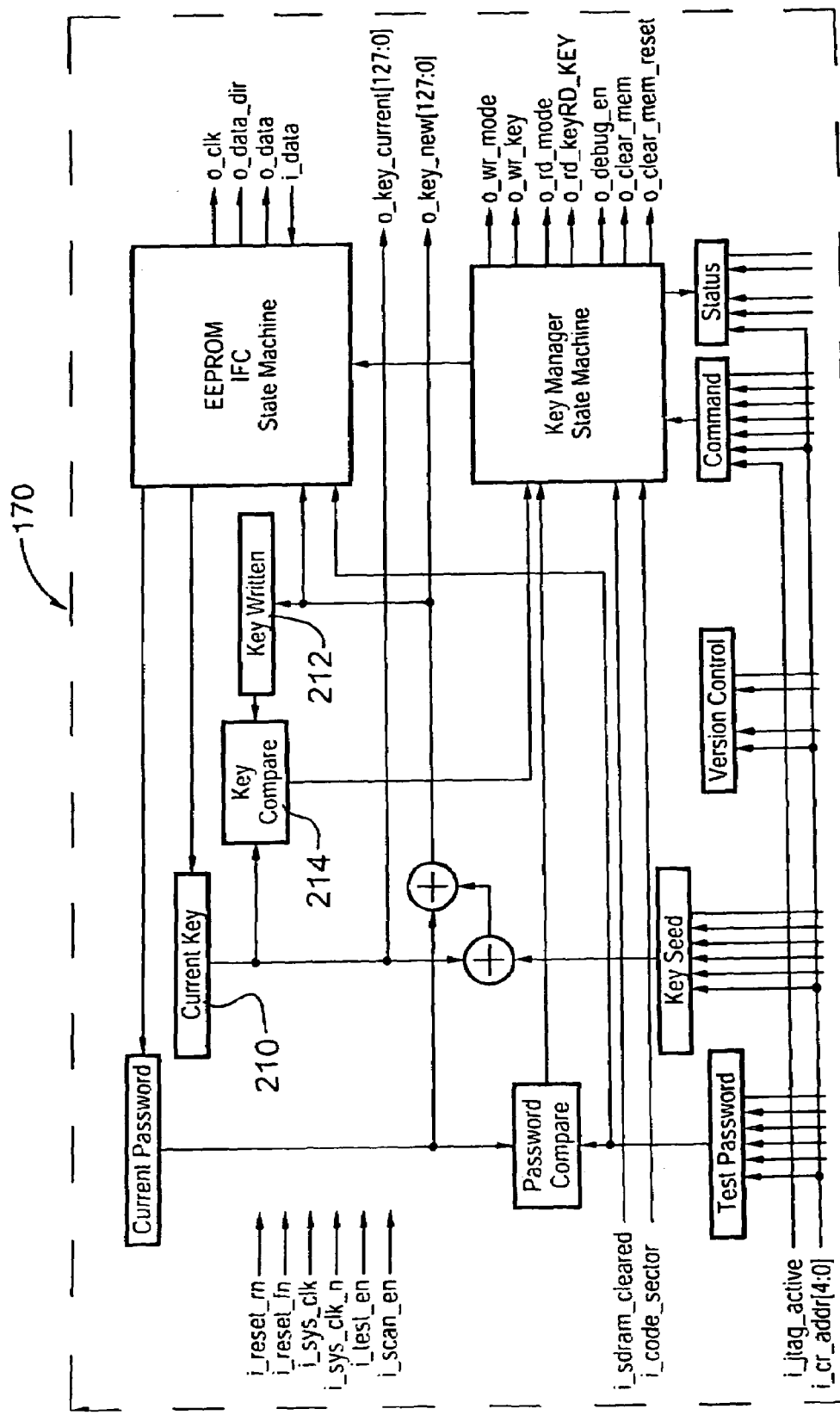
FIG. 5 is a block diagram of a Serial EEPROM Controller in the encryption module of FIG. 4.
Figure 6:
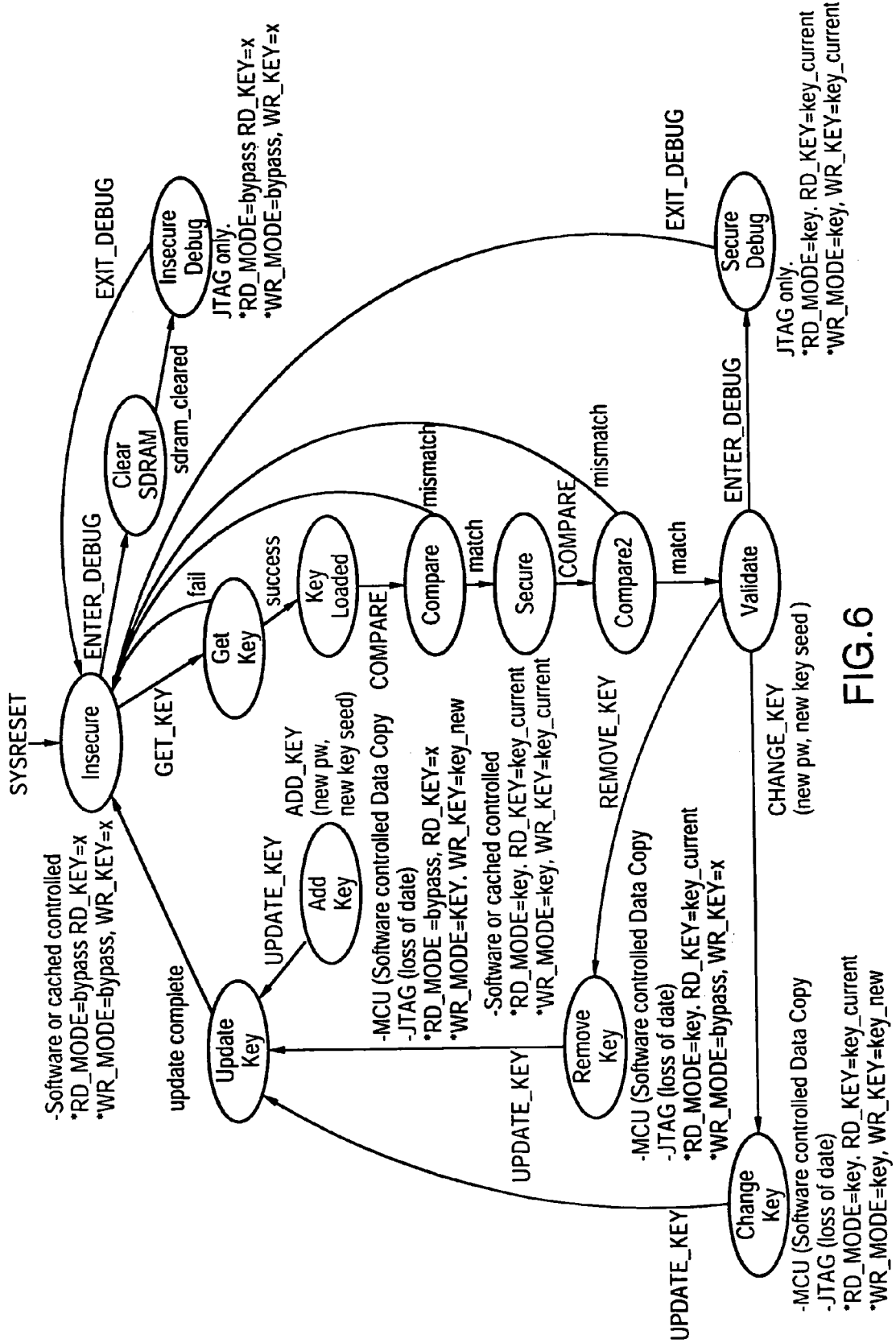
FIG. 6 is a state diagram for the Serial EEPROM Controller of FIG. 5.

The device 10 may use any available encryption methodology, a conventional AES encryption scheme being illustrated in FIG. 4 by way of example only. The encryption key is stored in a memory, in particular the serial EEPROM 180, and controlled by the SEC control module 170. According to a preferred embodiment of the system and method of the invention, through the SEC control module 170 testing software is able to access a CONTROL register, a STATUS register, and a DATA_SEED register. Using the CONTROL register, the testing software is able to use the GET_KEY, ADD_KEY, and COMPARE commands. The STATUS register provides the results of the COMPARE command.

Data Bit Control

To control the individual bits of the memory 180 during the test procedure, the value is written into the memory 180 according to the following equation:

NEW_DATA=CURRENT_DATA XOR DATA_SEED

CURRENT_DATA is the value read out from the memory 180. Using this equation, the individual bits of NEW_DATA will be equal to CURRENT_DATA with selected bits inverted. Bit positions are inverted when the corresponding positions in the DATA_SEED register are a '1'.

NEW_DATA is written into the memory 180 using the ADD_KEY command, read out using the GET_KEY command and verified using the COMPARE_KEYS command, as described below. Thus, in the preferred embodiment the memory test is carried out using new 128-bit encryption key as data, and the NEW_DATA is written to the memory (EEPROM 180), and simultaneously to a DATA_WRITTEN register, in a batch of 128 bits. All of these operations are executed by the Serial EEPROM Controller (SEC) 170. By repeating this procedure as required, all bit positions can be controlled and tested in both the logic 1 and 0 states, while NEW_DATA and CURRENT_DATA are never actually known or ascertainable by the testing software, only that certain bit positions have been inverted.

The GET_KEY command is issued when CMD[2:0]="000" is written to the SEC-CTRL register. This command retrieves the current key and password set from the EEPROM 180. In the preferred embodiment there may be more than one key-password pair stored, either for redundancy or to allow for the use of different encryption keys with data from different sources. The particular key and password set is determined by KEY_SELECT[1:0] found in the SEC control register (FIG. 7).

The COMPARE_KEYS command is issued when CMD[2:0]="001" is written to the SEC control register. In normal operation this command provides the results of two comparisons: It compares the current password with the test password, and it compared the current key with the previously written key. The results are preferably provided in the SEC-STATUS register (FIG. 8). In the testing procedure this command is used to verify the writing of bits into the memory 180, as described below.

The ADD_KEY command is issued when CMD[2:0]="010" is written to the SEC control register. This command forms the new key from the current password, current key, and the software-supplied key seed. This new key can be used in the data copy operations. The new password is also supplied by software and will come into effect when the UPDATE command is executed. The current key and current password are retrieved with the GET_KEY command. When the ADD_KEY command is used for the memory testing method of the invention, a preset password is written into memory when the ADD_KEY command is issued, for example "0000", to invoke the memory test (as opposed to actually generating a new encryption key for encryption purposes). Once 0000 has been entered as a password the new encryption key is generated for test purposes without using the current password; i.e. solely according to the equation

NEW_DATA=CURRENT_DATA XOR DATA_SEED

The Serial EEPROM Controller module is accessed through the configuration bus interface, as shown in FIG. 2. The configuration bus is controllable from the microprocessor controller unit (MCU) interface control, and from the JTAG (debugging) interface. EEPROM testing is then effected using the current key block 210, the key written block 212, and the key compare block 214. The encryption key is generated and written into the EEPROM 180, and the key can then be read out and compared with the key written using the COMPARE command and monitored using the KEY_STATUS[1:0] found in the SEC-STATUS register.

Data Verification

In order to verify the writing of bits into the memory 180, a DATA_WRITTEN register is used with the COMPARE command. When NEW_DATA is written into the memory 180, a copy of NEW_DATA is placed in the DATA_WRITTEN register. When data is read from the memory, it is compared with the DATA_WRITTEN register.

Thus, at no time is the data written into the memory 180, or the data read out of the memory 180, or the data copied into DATA_WRITTEN, known or ascertained to the software. Only the result of the comparison between the data read out and the DATA_WRITTEN is known.

Various embodiments of the system and method of the invention having been thus described by way of example, it will be apparent to those skilled in the art that variations and modifications may be made without departing from the invention.

I claim:

1. A method of testing a data storage device comprising the steps of:
   a. reading a Current Value of a memory location in the data storage device, comprising a plurality of bits of data,
   b. writing a New Value into the same memory location in the data storage device according to the equation New Value=Current Value XOR Data Seed where Data Seed is a value obtained from a data seed register,
   c. writing a copy of New Value into a data-written register,
   d. reading New Value out of the data storage device,
   e. comparing New Value read out of the data storage device in step d. to the corresponding New Value in the data-written register to verify the accuracy of the data read out of the data storage device in step d.

2. The method of claim 1 wherein New Value comprises bits in a new encryption key generated from at least a current encryption key and a key seed.

3. The method of claim 1 wherein in step d. a command for retrieving a current encryption key is used to read New Value out of the data storage device.

4. The method of claim 1 comprising the step of writing the comparison values returned in step e. to a status register.

5. The method of claim 1 comprising, after step e., the step of repeating steps a., b. and c. for a plurality of memory locations in the data storage device.

6. The method of claim 1 in which the method of testing is invoked by, before step a., invoking a routine for generating a new key in conjunction with the step of writing a preset password into memory.

7. A system for testing a data storage device comprising a processor for reading a Current Value of each of a plurality of memory locations in the data storage device, comprising a plurality of bits of data, generating for Current Value a New Value according to the equation New Value=Current Value XOR Data Seed where Data Seed is a value obtained from a data seed register, and writing New Value into the same memory location in the data storage device that stored the corresponding Current Value, and a data-written register for storing a copy of New Value, whereby the accuracy of the data read out of the data storage device can be verified by comparing New Value in the data storage device with the corresponding New Value in the data-written register.

8. The system of claim 7 wherein New Value comprises bits in a new encryption key generated from at least a current encryption key and a key seed.

9. The system of claim 7 wherein the processor reads New Value out of the data storage device using a command for retrieving a current encryption key.

10. The system of claim 7 comprising a status register for storing the comparison of New Value in the data storage device with the corresponding New Value in the data-written register.

11. A computer program product for use with a computer, the computer program product comprising a computer usable medium having computer readable program code means embodied in said medium for testing a data storage device, said computer program product having
    a. computer readable program code means for reading a Current Value of a memory location in the data storage device, comprising a plurality of bits of data,
    b. computer readable program code means for writing a New Value into the same memory location in the data storage device according to the equation New Value=Current Value XOR Data Seed where Data Seed is a value obtained from a data seed register,
    c. computer readable program code means for writing a copy of New Value into a data-written register,
    d. computer readable program code means for reading New Value out of the data storage device, and
    e. computer readable program code means for comparing New Value read out of the data storage device to the corresponding New Value in the data-written register to verify the accuracy of the data read out of the data storage device.

12. The computer program product of claim 11 further comprising computer readable program code means for generating New Value from bits in a new encryption key generated from at least a current encryption key and a key seed.

13. The computer program product of claim 11 further comprising computer readable program code means for issuing a command for retrieving a current encryption key in order to read New Value out of the data storage device.

14. The computer program product of claim 11 further comprising computer readable program code means for writing comparison values returned to a status register.

15. The computer program product of claim 11 further comprising computer readable program code means for invoking the method of testing by invoking a routine for generating a new key in conjunction with the step of writing a preset password into memory.

* * * * *